United States Patent
Dec et al.

(10) Patent No.: US 10,250,559 B2
(45) Date of Patent: Apr. 2, 2019

(54) REVERSIBLE MAPPING OF NETWORK ADDRESSES IN MULTIPLE NETWORK ENVIRONMENTS

(71) Applicant: Cisco Technology, Inc.

(72) Inventors: Wojciech Dec, Amsterdam (NL); Yegnanarayanan G. Chandramouli, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 558 days.

(21) Appl. No.: 14/031,165

(22) Filed: Sep. 19, 2013

(65) Prior Publication Data

US 2015/0081864 A1   Mar. 19, 2015

(51) Int. Cl.
*H04L 29/12*   (2006.01)

(52) U.S. Cl.
CPC ........ *H04L 61/2557* (2013.01); *H04L 61/251* (2013.01)

(58) Field of Classification Search
CPC ............... H04L 61/2557; H04L 61/251; H04L 61/2521; H04L 61/25; H04L 61/255
USPC ........................................................ 709/223
See application file for complete search history.

(56) References Cited

U.S. PATENT DOCUMENTS

| | | | | |
|---|---|---|---|---|
| 7,181,612 B1 * | 2/2007 | Pellacuru | .......... | H04L 29/12367 370/338 |
| 7,346,770 B2 * | 3/2008 | Swander | ............. | H04L 63/0464 709/201 |
| 7,797,419 B2 * | 9/2010 | Bhattacharya | .... | H04L 29/12518 709/220 |
| 7,853,680 B2 * | 12/2010 | Phatak | .............. | H04L 29/12066 370/401 |
| 8,396,946 B1 * | 3/2013 | Brandwine | ......... | H04L 12/6418 709/220 |
| 8,566,612 B2 * | 10/2013 | Davis | ...................... | G06F 21/72 370/218 |
| 8,942,235 B1 * | 1/2015 | Vinapamula Venkata | ................... | H04L 63/02 370/254 |
| 2003/0210689 A1 * | 11/2003 | Davis | .................... | H04L 45/745 370/389 |
| 2005/0013280 A1 * | 1/2005 | Buddhikot | ........ | H04L 29/12358 370/349 |
| 2010/0061380 A1 * | 3/2010 | Barach | .............. | H04L 29/12339 370/400 |
| 2012/0297089 A1 * | 11/2012 | Carothers | ........... | H04L 61/2517 709/245 |

(Continued)

*Primary Examiner* — Krista M Zele
*Assistant Examiner* — Timothy Sowa
(74) *Attorney, Agent, or Firm* — Campbell Stephenson LLP

(57) ABSTRACT

A method for translating network addresses includes receiving a first network packet, the first network packet comprising an internal source address. The method also includes generating, by performing a mapping operation, a mapping value. The generating of the mapping value uses, at least in part, at least a portion of the internal source address, and at least a portion of an external source address. The external source address is associated with the internal source address. The method also includes forwarding, using a second network packet, at least a portion of the first network packet. The second network packet comprises the external source address and at least a portion of the mapping value.

23 Claims, 10 Drawing Sheets

(56) References Cited

U.S. PATENT DOCUMENTS

| | | | | |
|---|---|---|---|---|
| 2013/0091303 A1* | 4/2013 | Mitra | ............... | H04L 61/2557 709/238 |
| 2013/0111065 A1* | 5/2013 | Donley | ............... | H04L 69/22 709/245 |
| 2013/0301650 A1* | 11/2013 | Zou | ............... | H04L 61/251 370/467 |

* cited by examiner

REVERSIBLE MAPPING OF NETWORK ADDRESSES IN MULTIPLE NETWORK ENVIRONMENTS

TECHNICAL FIELD

The present disclosure relates generally to network communications, and more particularly to the mapping of network addresses in such environments.

BACKGROUND

Communication networks connect network clients (computer systems) to allow these devices to exchange data with each other. Communication protocols define the techniques and format that these devices use when exchanging data via the communication networks. Communication networks connect the devices over various media, such as optical, electrical, or wireless media, and/or a combination thereof. Furthermore, a network can include network devices that facilitate such communication. These network devices (such as switches, routers, etc.) provide, for example, routing functionality that can route data from one network segment to another network segment within a larger communication network.

Often, devices on one network segment will use a different addressing scheme (e.g., a private or a non-routable addressing scheme) from what is used by another network segment. In order for a device on such a network segment to communicate data with a device on another network segment, an address translation is typically performed. A network address translation (NAT) device typically performs such network address translations. Thus, a device typically sends communication to an NAT device, which performs network address translation, and then forwards this communication using a different network address to a device on another network segment.

NAT devices can be used, for example, to translate network addresses of communications received from devices of an internal network (e.g., an intranet) to addresses that are used by an external network. However, such NAT devices typically use translation tables to store network addresses used by devices of an internal network and corresponding network addresses as used by the external network. Furthermore, because such translation tables often become very large (e.g., with thousands of entries), translation table lookup can be very expensive in terms of computational power, especially since each NAT device typically translates network addresses of a nearly constant stream of data packets being transmitted between devices of an internal network and those of the external network.

BRIEF DESCRIPTION OF THE DRAWINGS

The embodiments of the present application may be better understood, and its numerous objects, features, and advantages made apparent to those skilled in the art by referencing the accompanying drawings.

Figure 1:
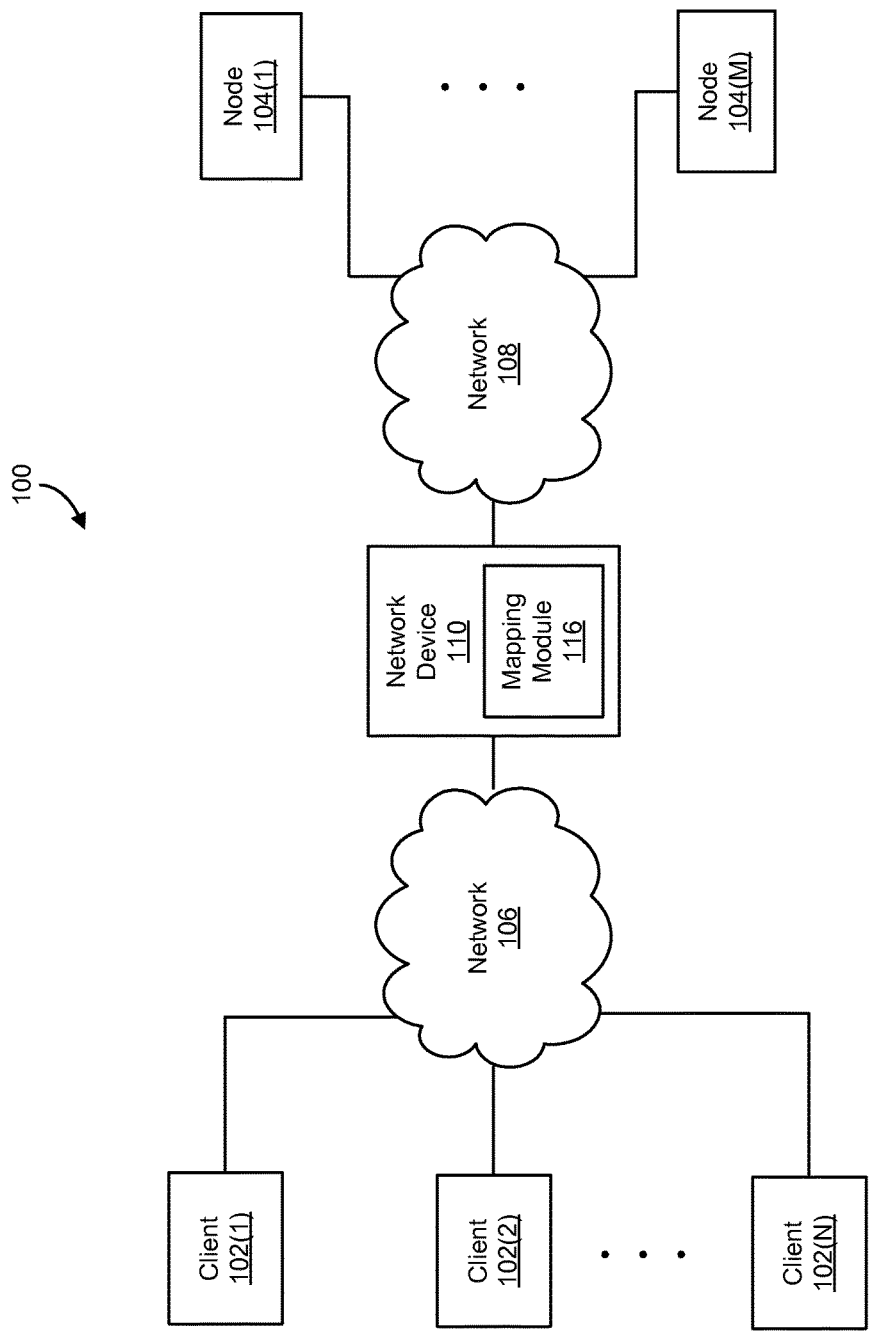
FIG. 1 is a block diagram illustrating a distributed system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the disclosure as defined by the appended claims.

DESCRIPTION OF EXAMPLE EMBODIMENTS

Overview

In general, methods for translating network address according to systems such as those described herein include receiving a first network packet, the first network packet comprising an internal source address. Such methods also include generating, by performing a mapping operation, a mapping value. The generation of the mapping value uses, at least in part, at least a portion of the internal source address, and at least a portion of an external source address. The external source address is associated with the internal source address. The methods also include forwarding, using the second network packet, at least a portion of the first network packet. The second network packet comprises the external source address and at least a portion of the mapping value.

Example Embodiments

In certain embodiments, a mapping module facilitates communication of data between multiple devices. Such a mapping module can be implemented using network devices such as switches or routers, and so can be a part of a communication network. Such a communication network can include multiple network segments, where each network segment can use a different addressing scheme. The mapping module translates the network addresses of network packets that originate at devices of a first network segment to network addresses used by a second network segment.

To better explain such techniques, it will be appreciated that, in light of the present disclosure, a mapping module such that described herein typically translates internal network addresses (e.g., used by devices on a first network, such as an intranet) to external network addresses (e.g., used by devices on a second network, such as the Internet). Data communication from client devices on the first network is typically funneled through the mapping module. Furthermore, the client devices typically use an internal addressing scheme that is only common to that first network, i.e., the internal addressing scheme does not work (i.e., is not addressable) outside of the first network.

Such internal network addresses can conform to a first network protocol (such as Internet Protocol version 4 (IPv4)). External network addresses can conform to a second network protocol (such as Internet Protocol version 6 (IPv6)). Such network protocols define, among other things, the manner in which network packets are addressed. For example, network addresses that conform to the IPv4 standard use a 32-bit address, while network addresses that conform to the IPv6 standard use a 128-bit address. It is noted that in one implementation, the external network addresses can also conform to the same first network protocol; however, the internal network addresses of the first network protocol might still not be addressable outside of the first network, i.e., in certain situations.

The mapping module, upon receiving data communication from the client device, translates source addresses of the data communication (that are addressed in the address space of the first network, e.g., the intranet) to external address(es) that are addressable by devices outside of that first network. In turn, these external devices send data communications (e.g., packets intended for devices in the first network) that is addressable using the external addresses (i.e., using the address space of the external network). Upon receiving this data communication, the mapping module translates the external addresses to the internal addresses of the intended client device(s). Examples of the manner in which the mapping module performs such translations are described with reference to the Figures below.

FIG. 1 is a block diagram illustrating a distributed communication system 100 that includes one or more client devices 102(1)-102(N) that are communicatively coupled together by a network 106. Distributed communication system also includes one or more nodes 104(1)-104(M) that are communicatively coupled together by a network 108. Each such client and/or node is a computing device, such as a computer, mobile phone, tablet, etc., that is configured to communicate data with other client(s) and/or nodes.

Network 106 can be implemented as an intranet (e.g., a private IP network). Client devices 102 in network 106 are not directly connected to a network 108. Instead, any data communication between devices (e.g., nodes 104) in network 108 and devices 102 are transmitted through a mapping module 116 (in the manner described below). In one implementation, devices 102 in network 106 are addressable using private network addresses. Private network addresses are network addresses that are not routable between networks 104 and 108. In other words, a private network address is not visible by devices in network 108. Instead, to communicate with devices 102, devices in network 108 address mapping module 116 (or a network device 110 that implements mapping module 116).

In order for a device on a first such network segment to communicate data with a device on another network segment, an address translation is performed. A mapping module (which can include functionality of a network address translation (NAT) module) typically performs such network address translations. Thus, a device sends data communication to a mapping module, which performs network address translation, and then forwards this communication using a different network address to a device on another network segment.

Mapping modules can be used, for example, to translate network addresses of communication received from devices of an internal network (e.g., an intranet) to addresses that are used by an external network, but are able to do so in a more efficient, effective, manner than heretofore possible. In one embodiment, a binding of an internal address to an external address is established by selecting an available external address from a pool of such addresses. A mapping module can populate translation tables to store network addresses used by devices of an internal network and corresponding network addresses as used by the external network. Since these translation tables often get very large, such as having thousands of entries, the selection of an available external address or a translation table lookup can be very expensive in terms of computational power, especially since each mapping module typically translates network addresses of a nearly constant stream of data packets being transmitted between devices of an internal network and of the external network.

In some embodiments, a mapping module uses a reversible mapping operation to translate network addresses between a first and a second network. Upon receiving data communication from client 102(1), mapping module 116 converts one or more internal network addresses of network 106 to one or more corresponding external network addresses of network 108. Mapping module 116 performs this conversion using a mapping operation, such as using a reversible hash or other reversible function. As explained in more detail below, mapping module 116 applies such a mapping operation using the internal address as an input. This mapping operation generates a value, which is then transmitted to the intended destination device in network 108 (such as device 104(1)). Data packets transmitted to device 104(1) from mapping module 116 can thus include the address of mapping module 116 (indicating mapping module 116 being the originating module, i.e., the source node), as well as the calculated value.

In one embodiment, a mapping module determines whether to use the NAT address translation functionality or to use the reversible mapping operations. This determination can be based, for example, on the content of header portions of the data packets (i.e., inbound or outbound data packets). For example, the mapping module can determine to perform NAT address translation if a header includes an indication of an NAT translation; or to perform reversible mapping operations if the header includes an indication of a reversible mapping operation. These indications can be implemented, for example, using predetermined bit(s) of the header. In another embodiment, the mapping module can determine, for example, to use the reversible mapping operation if an inbound data packet includes certain data element(s) (e.g., a mapping value) used by the reversible mapping operations. In yet another embodiment, if an outbound data packet does not include certain data elements used by the NAT address translation functionality, then the mapping module would use the reversible mapping operations.

In one embodiment, the mapping module initially computes an external address that corresponds to the internal address. The mapping module can use the reversible mapping operation to compute this external address algorithmically. In one embodiment, the mapping module can also determine whether this algorithmically computed external address is valid for the address space of the external network. This external address can be invalid, for example, if the external address is outside a range of possible addresses, it is taken by another device, and/or it is a reserved address. If the computed external address is determined to be invalid, then the mapping module determines to use the NAT address translation functionality, i.e., to bind this internal address to an external address by selecting an available external address from a pool of such addresses. In other words, the reversible mapping operation may compute a value that is invalid for the external address space, and in which case, the mapping module would use the binding mechanism of the NAT address translation functionality. On the other hand, if the computed external address is determined to be valid, then the mapping module determines to use the reversible mapping operation.

Device 104(1) can also transmit data communication intended for client 102(1). This inbound data communication is addressed to mapping module 116 (or network device 110) instead of the intended client device. The inbound data communication includes the mapping value (generated by the mapping operation) that was received by device 104(1). Upon receipt of this data communication, mapping module 116 can perform a reverse mapping operation to generate the internal address of client 102(1). In other words, mapping module 116 uses the mapping value to re-generate the original input value, as originally received by the mapping operation (when the mapping module performed the mapping operation as part of transmitting the outbound data).

One reason for using a private network is to allow companies, organizations, or other entities to use IP addresses that would otherwise be assigned to other such entities. In the case of IPv4 network address space, there is now a shortage of IPv4 network addresses that are available for new network devices. Put another way, the shortage of IP addresses under the IPv4 addressing scheme means that there are not enough IPv4 network addresses that can be assigned to each network device. Another reason for using private networks is to isolate entity's network devices (i.e., client devices 102) from network's devices outside the private network (e.g., network devices connected to the rest of the Internet). As a result, network devices within the private network are not directly addressable by network devices outside of the private network (e.g., outside of a company's intranet).

However, in another implementation, instead of being a part of such a private network, devices 102 are simply addressable from external devices in network 108 using another addressing scheme. In such implementations, network 108 can be implemented as simply another intranet or another type of a private network, among other such alternatives. In yet another variation, both networks 106 and 108 can be private networks. In this implementation, networks 106 and 108 implement nested private network address spaces.

The devices in either one of these nested private address spaces could be configured to access the external network (i.e., the Internet), for example, by using the functionality of the mapping module twice for the devices in the private network furthest away from the external network (i.e., once for converting the network address from a first private space to a second private space, and then for converting from the second private space to the external address), and once, for the devices in the private network closer to the external network (i.e., once for converting the network address from a second private space to the external network).

In any of the above implementations, mapping module 116 performs reversible network address translations. When using such reversible functions, the translations performed do not require a translation address table, such as those employed by certain hashing functions (i.e., there is no need for a translation table containing all of the bindings between inside and external addresses). For embodiments in which the mapping operation is a hashing function, mapping module 116 generates a hash value. Regardless of the actual implementation of the mapping operation, the mapping operation uses one or more values of an outbound network packet (i.e., generated by client 102(1) and addressed to node 104(1)). The mapping value is then sent with an outbound network packet (which can be a forwarded (outbound) network packet or another network packet) to node 104(1). However, this outbound packet (i.e., sent by mapping module 116) does not include the internal address of client device 102(1).

Mapping module 116 also receives and processes network packets from nodes 104, including from node 104(1). An inbound network packet that is sent by node 104(1) includes the mapping value and an address of mapping module 116 (or of network device 110), but not the internal address of client device 102(1). Mapping module 116 then applies a reverse of the mapping operation to the mapping value, and depending on the implementation, also to the network address of node 104(1) and/or mapping module 116. The reverse mapping operation generates the internal address of client device 102(1), which is then used to forward the inbound network packet to client device 102(1). The use of functions to generate values from network addresses, and then reversing the function is explained in more detail below.

Figure 2:
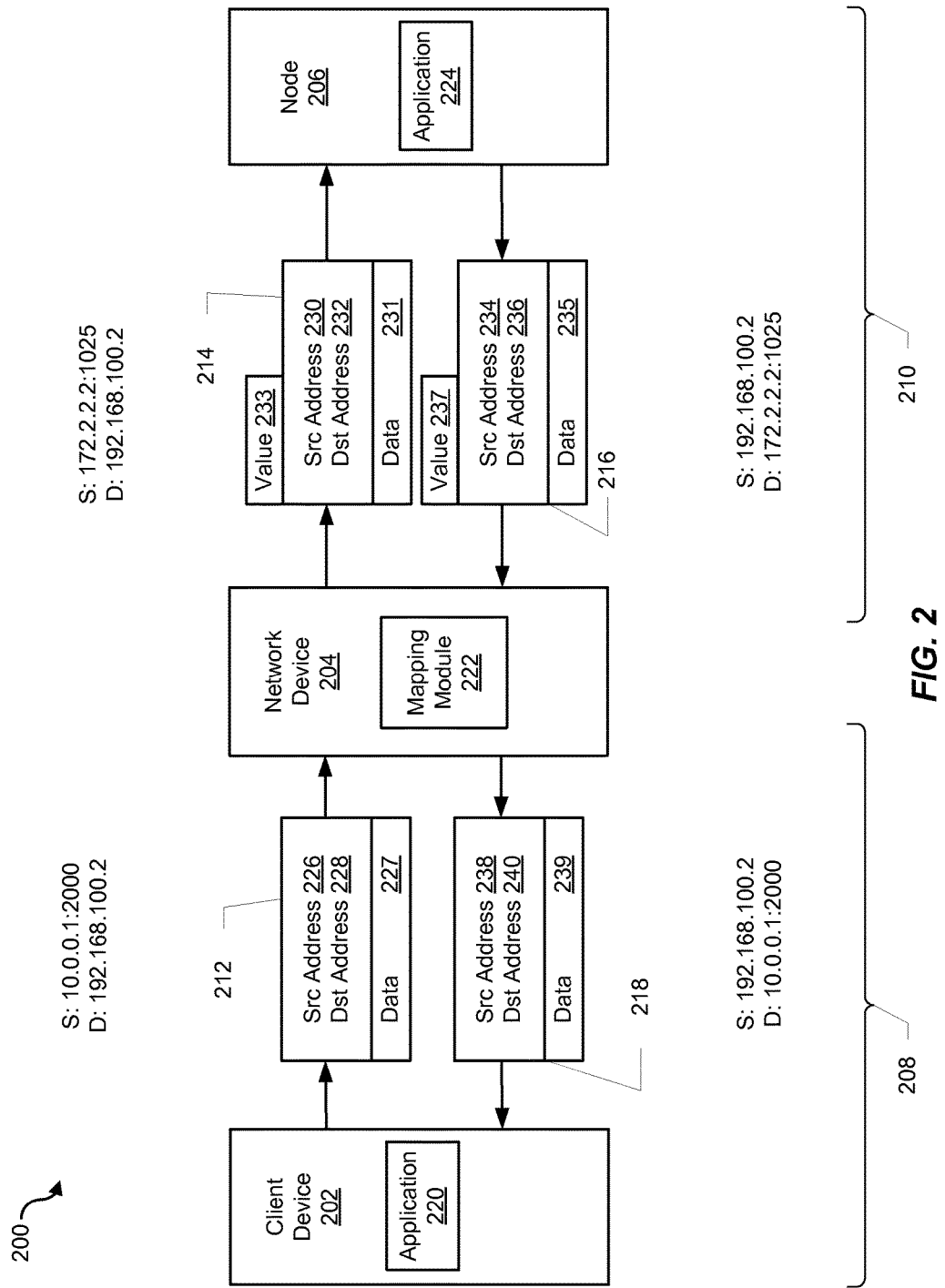
FIG. 2 is a block diagram illustrating example communication between an internal device and an external device, according to one embodiment.

A distributed system 200 of FIG. 2 illustrates example communications between an internal client device and an external node, according to some embodiments. Distributed system 200 includes a client device 202 that is communicatively coupled to a network device 204. Distributed system 200 also includes a node 206 that is communicatively coupled to network device 204. Client device 202 is not directly addressable by node 206, i.e., node 206 cannot send a network packet that is directly addressed to client device 202. However, depending on the implementation, client device 202 may be able to send a network packet that is directly addressed to node 206. It is noted that, for ease of explanation, only one client 202 and one node 206 are shown, although both networks 208 and 210 can each include multiple additional network devices and/or nodes. Each such client device and/or node is a computing device, such as a computer, mobile phone, tablet, etc., that is configured to communicate data with other client(s) and/or nodes. Furthermore, the terms client devices and nodes can be used interchangeably, and are used with reference to specific networks 208 and 210 for ease of explanation only.

Client 202 generates an outbound network packet 212 that includes a source address 226 and a destination address 228. It is noted that outbound network packet 212 can also include various other elements, such as data, error recovery bits, control commands, etc., which are not shown for ease of explanation. Outbound network packet can be implemented as an Internet Protocol (IP) datagram, such as according to the IPv4 standard. In one implementation, outbound network packet 212 also includes a port number that identifies a communication port on client device 202.

For example, client device 202 can transmit outbound packet 212 to node 206, such as to access a web service or data provided by node 206. Outbound packet 212 includes a source address 226. If network 208 is implemented using IPv4, this source address can, for example, indicate 10.0.0.1: 2000, where 10.0.0.1 is the private IP address of client device 202, and 2000 indicates a port of client device 202. Outbound packet 212 also includes a destination address 228 of node 206. If network 208 is implemented using IPv4, this source address can, for example, indicate 192.168.100.2. Destination address 228 can also indicate a port number, if desired. It is noted that node 206 can be addressed using IPv4 or IPv6 addressing, or another type of a network address protocol, which would be transparent to client device 202. Outbound packet 212 is received and processed by mapping module 222 prior to being forwarder or routed to node 206.

It is noted that, in some embodiments, network packets 212, 214, 216, and 218 of FIG. 2 illustrate a header (i.e., source and destination addresses) and data components (i.e., data components 227, 231, 233, and 239, correspondingly) of a packet formatted according to an IP layer of a larger network packet. These larger network packets can encapsulate header and data components for various layers of a communication protocol. For example, the header and data components of each of network packet 212, 214, 216, and 218 can be implemented using the IP portion of a network packet implementing multiple network layers. The IP layer can be implemented according to the IPv4 or IPv6 specification, or another type of a network address protocol.

Furthermore, such network packets include information associated with link, transport, and application layers, which are not shown for ease of explanation. In some implementations, portions of the address/destination addresses can be stored using header/data of another network layer, such as using the transport layer (e.g., UDP or TCP). For example, for IPv4 network packets, the port portions of the destination and/or source addresses can be encoded using the transport layer, since the IP layer (as implemented using IPv4) does not have enough space to carry the port number. However, other implementations of encoding the port numbers in network packets are contemplated, such as using other fields in the IP header (or the header fields of other protocol layers) to carry this information.

Mapping module 222 can be implemented using network device 204, as shown. However, in other embodiments, mapping module 222 can be implemented as a standalone device, or as a part of another client or server. Mapping module 222 receives outbound packet 212 from client device 202. Mapping module 222 then accesses an external source address that corresponds to the source address 226. In one implementation, the external source address is the IP address of mapping module 222. In some implementations, mapping module 222 also accesses an external port number that is associated with the external source address. The external port number can be a number that is assigned dynamically for each internal IP address.

Mapping module 222 performs network address translations between network addresses of a first network 208 to network addresses of a second network 210. In one implementation, network 208 is a private network (such as one implemented using the IPv4 protocol). Private networks are not directly connected to external network(s) (i.e., network 210), such as the Internet. For example, private IPv4 network addresses can be chosen from address ranges of 10.0.0.0 to 10.255.255.255, 172.16.0.0 to 172.31.255.255, and 192.168.0.0 to 192.166.255.255. Regardless of the network protocol being used by network 208, these network addresses are intended to remain internal to network 208, and thus are not intended to be addressable by any outside network devices. Instead, any such network device (e.g., node 206 of network 210) sends network packets (that are intended to client device 202) to mapping module 222, along with certain additional information. Mapping module 222 then translates this additional information into the network address of client 202 (in network 208).

Mapping module 222 typically has a network address that is directly addressable in the address space of network 210. When mapping module 222 receives an outbound packet from a device in network 208, mapping module then forwards this packet with the external network address as seen by devices in network 210. For example, if network 210 is implemented using the IPv4 protocol, mapping module can have an external source address of 172.2.2.2.

Upon receiving outbound network packet 212, mapping module 222 accesses its own external source address. If network 210 is implemented using the IPv4 protocol, mapping module accesses its external source address of 172.2.2.2, and also generates a port number that is associated with outbound packet 212. For example, mapping module 222 can associate a port 1025 that corresponds to an external port number for client device 202. It is noted that this IPv4 source address of mapping module 222 can be translated to an IPv6 address, such as by associating the IPv4 network address with a certain IPv6 address (e.g., by calculating the IPv6 address), or by using another technique. In other implementations, the IPv4 source address of mapping module 222 can be transitioned to the corresponding IPv6 address by performing tunneling and/or dual-stack techniques.

Using a mapping operation, such as a hashing function, mapping module 222 then computes a value using the internal source address 226 (that can include the internal port) and optionally the corresponding external address 230 (that can include the external port). For the example given above, mapping module 222 can use a hashing function with inputs of 10.0.0.1 (i.e., the internal network address of client device 202) and 1025 (i.e., the external port), but additional and/or different inputs are contemplated, such as also including the external source address of mapping module 222 and/or the internal port number used by client device 202. This value is then sent with outbound packet 212. As described below, when mapping module 222 receives this value (e.g., in an inbound packet), this value is used to re-create the internal source address of client device 202(1).

If network 210 is implemented as an IPv4 network, then outbound packet 214 includes the destination address. The port number and/or a value 233 (generated using the function) can be transported using a different layer of the corresponding larger network packet, or using another field of the IP layer, such as using the data or options fields.

If network 210 is implemented as an IPv6 network, then outbound packet 214 includes a corresponding IPv6 address (e.g., such as FE80::0202:B3FF:FE1E:8329 (in collapsed format, which corresponds to FE80:0000:0000:0000:0202:B3FF:FE1E:8329)). This IPv6 address can also include the port number 1025, which can be represented as [FE80::0202:B3FF:FE1E:8329]:1025.

Regardless of the actual network protocol used by network 208, mapping module 222 then forwards at least some portion of received outbound packet 212 as an outbound packet 214. For example, mapping module 222 can forward at least some of received data 227 as data 231. Although not discussed here for ease of explanation, mapping module 222 also forwards other components of a larger data packet that contains the IP layer information shown by network packet 212. However, regardless of the actual network protocol used by network 208, outbound packet 214 does not include the internal source address of client 202. Instead, outbound packet 214 includes mapping value 233, e.g., the hash value as calculated by the hashing function. Destination address 232 is the address of node 206 (as also indicated by destination address 228 of outbound packet 212).

Upon receiving outbound packet 214, node 206 can then process this network packet (including processing data 231), such as by using an application 224. Node 206 then sends an inbound packet 216 that is addressed to a destination (of mapping module 222) that is the same as external source address 230 of the received outbound packet 214. Inbound packet 216 also includes a value 237, which corresponds to value 233 (e.g., the mapping value) as received by outbound packet 214. Source address 234 of inbound packet 216 is the network address of node 206.

Mapping module 222, upon receiving inbound packet 216, processes the addresses and value 237 to generate the internal network address of client device 202. Specifically, mapping module 222 applies a reverse of the mapping operation used to calculate this value. Depending on the implementation, mapping module 222 uses just value 237, or value 237 and additional elements, such as at least some portion of destination address 236, to generate the network address of client device 202.

Once the source network address of client device 202 is calculated, network device transmits an inbound packet 218. Inbound packet 218 includes a source address (which can be the same as source address 234, i.e., of node 206), a destination address (generated by mapping module 222), and data 239 (i.e., that can include at least a portion of data 235).

Generally, a mapping operation (also referred to as a function, such as a hashing function) is reversible if, given its output, the function can reconstruct the original input. Thus, mapping module 222 uses the reversible function (e.g., the reversible hashing function) to determine the initial source address. Thus, a function is reversible (i.e., function-1) if it can be used as follows:

Function (input)=Value; and

Function-1 (Value)=input; where input is the internal source address of the client device.

In one implementation, there are two inputs to this reversible function, internal source address of the client device and the external port number. The Function then computes a value, which is sent to the external device as part of the outbound network packet. In one embodiment, the external port number is also sent with the outbound network packet. Since the external port number is sent to the external node, it can be used by the mapping module 222 to calculate the internal source address.

Function (input1, input2)=Value; and

Function-1 (Value, input2)=input 1; where input 1 is the internal source address of the client device, and input 2 is the external port number.

For example, a reversible mapping operation can be a reversible function, such as a hashing function that computes a hashing index using two inputs. The reversed hashing function is then applied to the value and one of the inputs to recover the other input. Examples of reversible functions involve XOR rotations/bit shifting. For example, a hash function HashFun can be implemented as follows:

HashFun ^=HashFun>>9; and

Reverse of this above hashing function can be:

HashFun ^=(HashFun>>9) ^(HashFun>>18) ^(HashFun>>27).

However, other implementations of reversible mapping operations are contemplated.

It is noted that the methods of FIGS. 3A, 3B, 4A, and 4B, described below, illustrate various embodiments and aspects of processing network packets, including mapping of network addresses, as performed by the mapping module. As will be appreciated in light of the present disclosure, these methods may be modified in order to derive alternative embodiments. Also, some operations in these embodiments are shown in sequential order. However, certain operations may occur in a different order than shown, certain operations may be performed concurrently, certain operations may be combined with other operations, and certain operations may be absent in another embodiment(s).

Figure 3A:
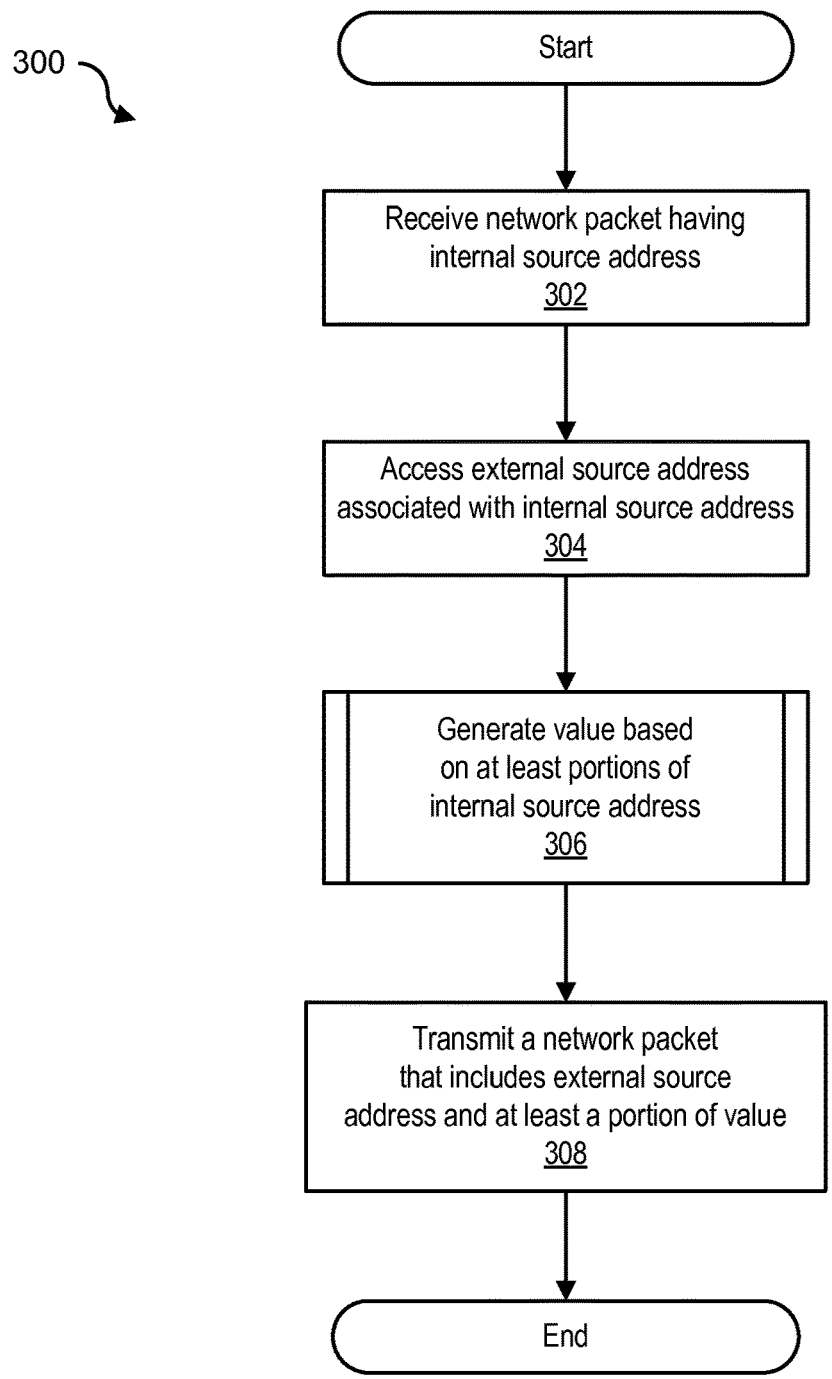
FIG. 3A is a flowchart illustrating a method for processing a network packet received from an internal device, according to some embodiments.

FIG. 3A illustrates a method 300 for processing of an outbound network packet that is received from an internal client device, according to some embodiments. Method 300 is described with reference to variations of the elements described in connection with FIGS. 1 and 2. In one embodiment, at least portions of method 300 are executed by a mapping module, such as mapping module 116 of FIG. 1 or mapping module 222 of FIG. 2.

In element 302, the mapping module receives a network packet from a client device. This outbound network packet includes a source address (referred to as an internal source address) of the client device (e.g., of client device 202). The source address can be implemented using a first network protocol, such as the IPv4 protocol. In one implementation, the source address also includes a port of the client device. The client device is a part of a first network, such as described above with reference to FIGS. 1 and 2.

In element 304, the mapping module accesses an external source address that is associated with the internal source address. With reference to FIG. 2, the external source address is the address of the mapping module as seen by the external network (i.e., network 210). Depending on the implementation, the external source address can be an IPv4 network address or an IPv6 network address, or another network address (as used by the external network). If implemented using IPv4, the external source address can also include a port of the mapping module.

In one implementation, the mapping module uses one external network address, meaning that the network communications from the internal network (that uses the mapping module) are addressed as originating from the mapping module's (single) external network address. In another implementation, the mapping module can use two or more external network addresses. This situation can arise, for example, if there several sub-networks within the private network, or if there are not enough ports (on the mapping module) available that can be uniquely assigned to each unique client device/client device's port combination.

In element 306, the mapping module generates a value based on at least a portion of the internal source address of the client device. The mapping module applies a mapping operation, such as a reversible hashing operation, to at least a portion of the internal source address of the client device. For example, if the first network protocol uses port numbers, then the mapping operation may use the internal source address but not necessarily the port number of the client device. In one implementation, this mapping operation may also include as another input the external port number (that is selected by the mapping module).

Figure 3B:
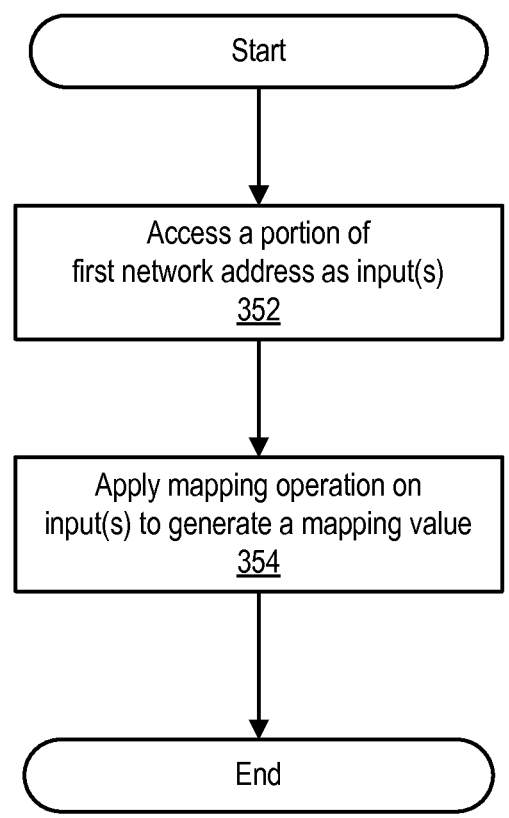
FIG. 3B is a flowchart illustrating a method for performing a mapping operation, according to some embodiments.

One embodiment of element 306 is described with reference to method 350 of FIG. 3B. At least portions of method 350 can be executed using a mapping operation (such as a hashing function). In element 352, the mapping module accesses a portion of the first network address. Depending on the implementation, the mapping module can also use a port number, if available. In element 354, the mapping module applies the mapping operation to the input(s). As described above with reference to FIG. 2, a function (that implements the mapping operation) generates a mapping value based on the input(s).

With reference back to FIG. 3A, in element 308, the mapping module transmits an outbound packet to a node at the destination address. This outbound packet includes the mapping value. Depending on the implementation of the external network, this outbound packet can be addressed using the IPv4 or IPv6 addressing scheme. The outbound packet includes at least a portion (e.g., the data element(s)) of the network packet received in element 302.

Figure 4A:
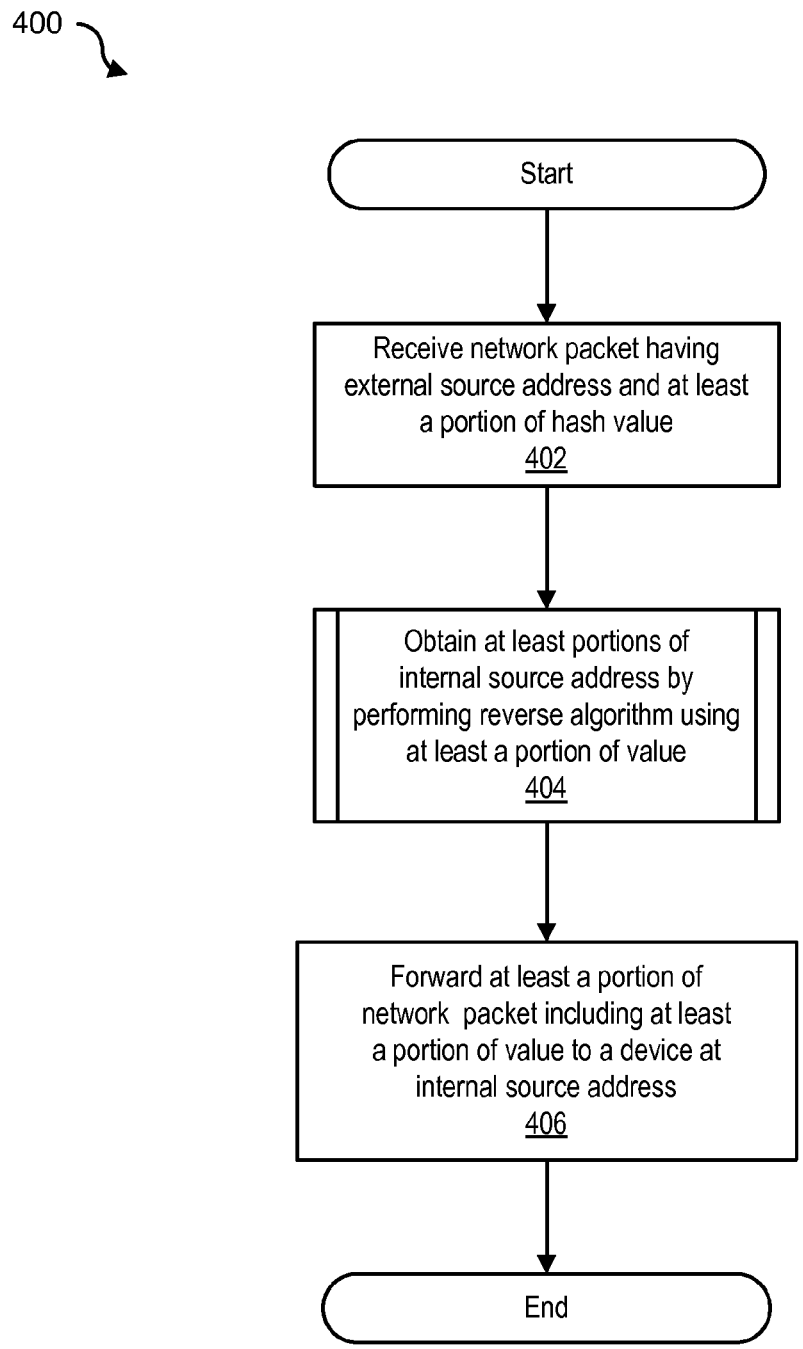
FIG. 4A is a flowchart illustrating a method for processing a network packet received from an external device, according to some embodiments.

FIG. 4A illustrates a method 400 for processing an inbound network packet that is received from a node device, according to some embodiments. Method 400 is described with reference to variations of the elements described in connection with FIGS. 1 and 2. In one embodiment, at least portions of method 400 are executed by an mapping module, such as mapping module 116 of FIG. 1 or mapping module 222 of FIG. 2.

In element 402, the mapping module receives a network packet from a node device. This inbound network packet includes a destination address (referred to as an external destination address) and a mapping value (e.g., a hash value). However, the external destination address does not indicate the client device, as the client device is not directly addressable by devices in the external network. In one implementation, the destination address is expressed according to the IPv4 protocol, and can include a port of the client device. In another implementation, the destination address is expressed according to the IPv6 protocol.

In element 404, the mapping module obtains the internal source address by applying a reverse of the mapping operation (e.g., the function). With reference to FIG. 2, the internal source address is the address of the client module in the private external network (i.e., network 208). The reverse of the function means that the function is given an output, and the mapping module calculates the input(s) that generated that output. For example, applying the reverse of the function can be accomplished by applying a reverse of the hashing operation of element 306.

Figure 4B:
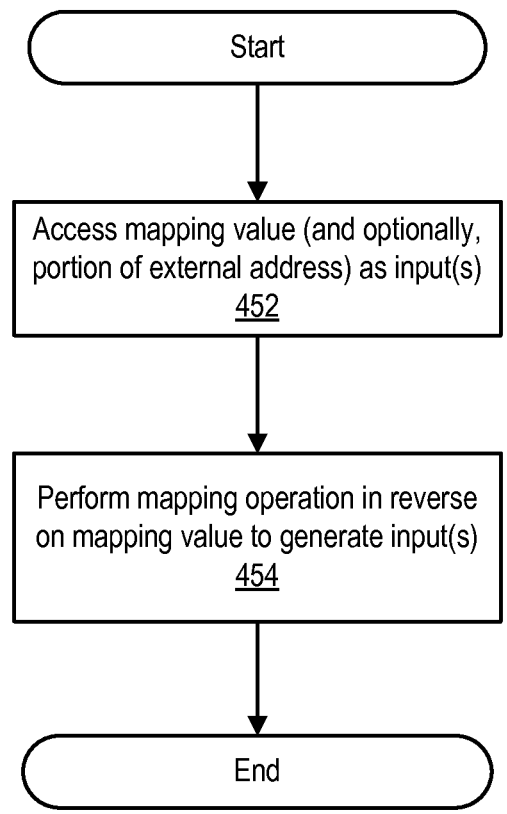
FIG. 4B is a flowchart illustrating a method for performing a reverse mapping operation, according to some embodiments.

One embodiment of element 404 is described with reference to method 450 of FIG. 4B. At least portions of method 450 can be executed using a mapping operation (such as a hashing function). In element 452, the mapping module accesses the mapping value. Depending on the implementation, the mapping module can also use a portion of the external network address. In element 454, the mapping module applies a reverse of the mapping operation to the input(s). As described above with reference to FIG. 2, a reverse of the function (that implements the mapping operation) generates a network address based on the mapping value as the input, (and optionally other input(s), such as the external network address).

With reference back to FIG. 4A, in element 406, the mapping module transmits an inbound packet to the client device at the internal destination address. For example, if the internal network is implemented using IPv4, then the inbound packet is addressed using the IPv4 addressing scheme. The inbound packet includes at least a portion (e.g., the data element(s)) of the network packet received in element 402.

Figure 5A:
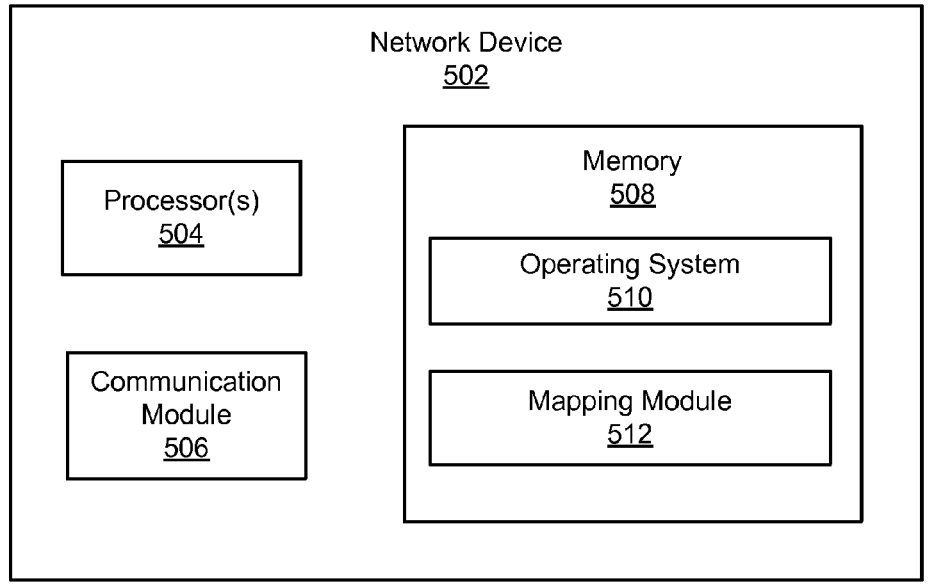
FIG. 5A is a block diagram illustrating a network device, according to one embodiment.

FIG. 5A is a block diagram illustrating an example network device, according to one embodiment. Network device 502, which can implement network device 110 and/or network device 204, includes a processor 504, a communication module 506, and a memory 508. Communication module 506 can receive and/or transmit network packets. Memory 508 includes an operating system 510 and mapping module 512. However, it is noted that one or more of element(s) of mapping module 512 can be implemented as software, hardware module(s), or some combination thereof. It is also noted that in some embodiments one or more of elements of node 502 may not be used. Processor(s) 504 executes one or more elements of mapping module 512. Mapping module 512 can be an implementation of mapping module 116 and/or 222, and can implement at least portions of methods 300, 350, 400, and 450.

Figure 5B:
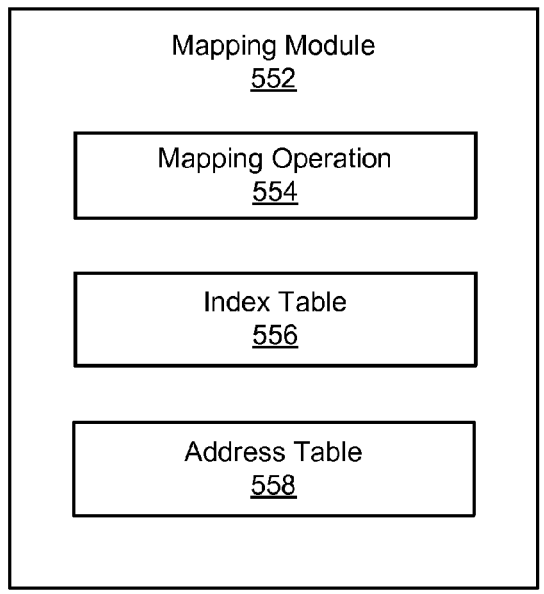
FIGS. 5B and 5C are block diagrams illustrating various embodiments of a mapping module, according to some embodiments.

FIG. 5B is a block diagram illustrating an example mapping module 552, according to one embodiment. Mapping module 552, which can implement mapping module 512, 116, and/or 222, includes a mapping operation 554, an index table 556, and an address table 558. Mapping operation 554 is a reversible function that is applied on inputs to generate a mapping value or a network address, as described above. Address table 558 can store the external network addresses of external devices and/or of mapping modules. It is noted that one or more of element(s) of mapping module 552 can be implemented as software, hardware module(s), or some combination thereof.

Index table 556 can implement a cache table that is maintained for temporarily storing mapping values when a stream of outbound network packets is processed by mapping module 552. When processing a stream of network packets, multiple outbound network packets are sent to the client devices in the external network. In one implementation, mapping module stores the mapping values of each of such network packets until confirmations are received that these network packets are received by the devices in the external network. Once the conformations are received, the mapping values in index table 556 are deleted.

Figure 5C:
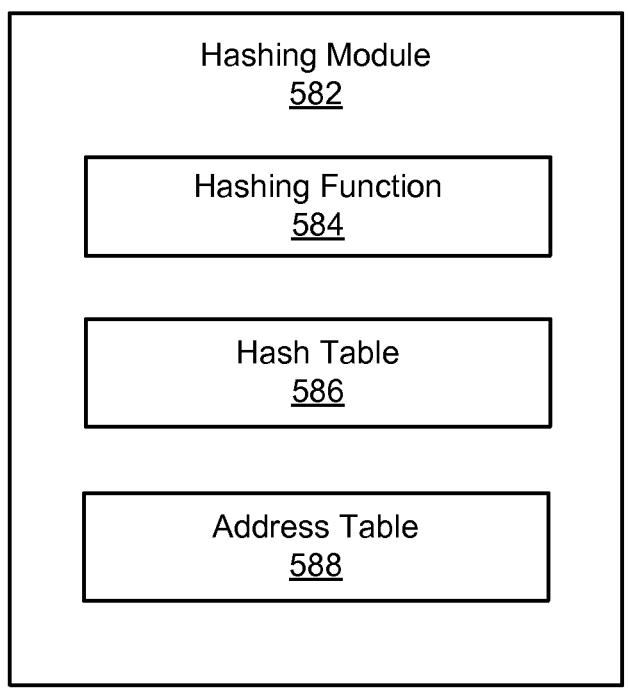

FIG. 5C is a block diagram illustrating an example hashing module 582 that can be an implementation of mapping module 552, according to one embodiment. Hashing module 582 includes a hashing operation 584, an index table 586, and an address table 588. Hashing operation 584 is a reversible hashing function that is applied on inputs to generate a mapping value or a network address, as described above. Index table 586 can implement a cache table that is maintained for temporarily storing hash values when a stream of outbound network packets is processed by hashing module 582 (similarly to the operation of FIG. 5B). Address table 588 can store the external network addresses of external devices and/or of mapping modules. It is noted that one or more of element(s) of hashing module 582 can be implemented as software, hardware module(s), or some combination thereof. It is also noted that in some embodiments one or more of elements of hashing module 582 may not be used.

Figure 6:
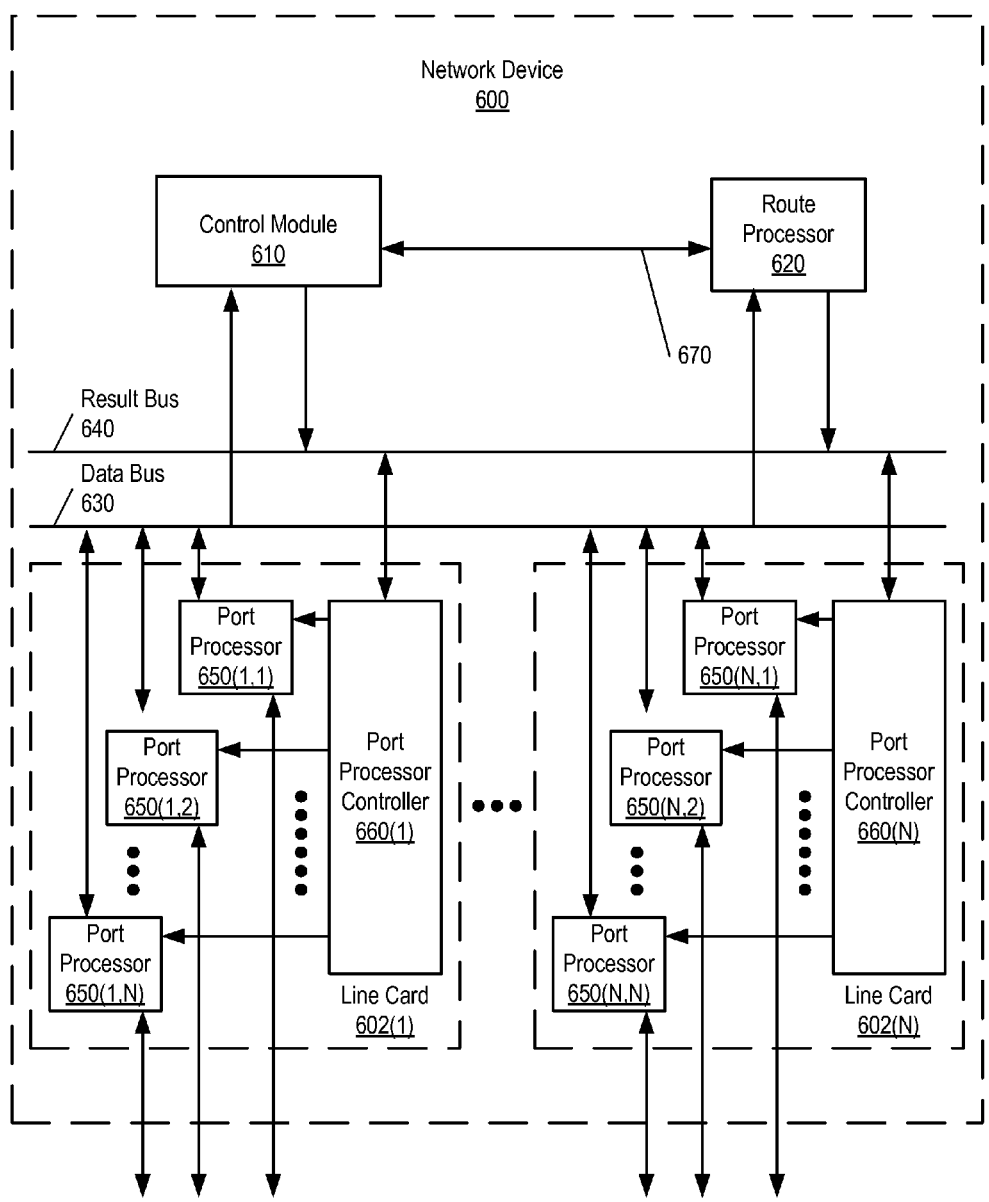
FIG. 6 is a block diagram illustrating relevant components of an example device in which the present disclosure can be implemented, according to one embodiment.

FIG. 6 is a block diagram illustrating relevant components of an example device 600 (e.g., network device 60, 204, and/or network device 502). In this depiction, device 600 includes a number of line cards (line cards 602(1)-602(N)) that are communicatively coupled to a control module 610 (which can include a forwarding engine, not shown) and a route processor 620 via a data bus 630 and a result bus 640. Line cards 602(1)-(N) include a number of port processors 650(1, 1)-650(N, N) which are controlled by port processor controllers 660(1)-660(N). It will also be noted that control module 610 and route processor 620 are not only coupled to one another via data bus 630 and result bus 640, but are also communicatively coupled to one another by a communications link 670. It is noted that in alternative embodiments, each line card can include its own forwarding engine.

When a message (e.g., any of control messages (e.g., requests, notifications, confirmations, indications, etc.) that may be exchanged between nodes) is received, the message is identified and analyzed by a network device such as device 600 in the following manner. Upon receipt, a message (or some or all of its control information) is sent from one of the port processors 650(1, 1)-650(N, N) at which the message was received to one or more of those devices coupled to data bus 630 (e.g., others of port processors 650(1, 1)-650(N, N), a forwarding engine, and/or route processor 620). Handling of the message can be determined, for example, by a forwarding engine. For example, a forwarding engine may determine that the message should be forwarded to one or more of port processors 650(1, 1)-650 (N, N). This can be accomplished by indicating to corresponding one(s) of port processor controllers 660(1)-660(N) that the copy of the message held in the given one(s) of port processors 650(1, 1)-650(N, N) should be forwarded to the appropriate one of port processors 650(1, 1)-650(N, N).

Device 600 can implement the control modules and/or the TR modules (e.g., in control module 610, or in one of port processor controllers 660(1)-660(N) and/or in route processor 620) in order to facilitate reversible mapping of network addresses in NAT environments. Device 600 can thus implement the method(s) illustrated in FIGS. 3A-4B.

Figure 7:
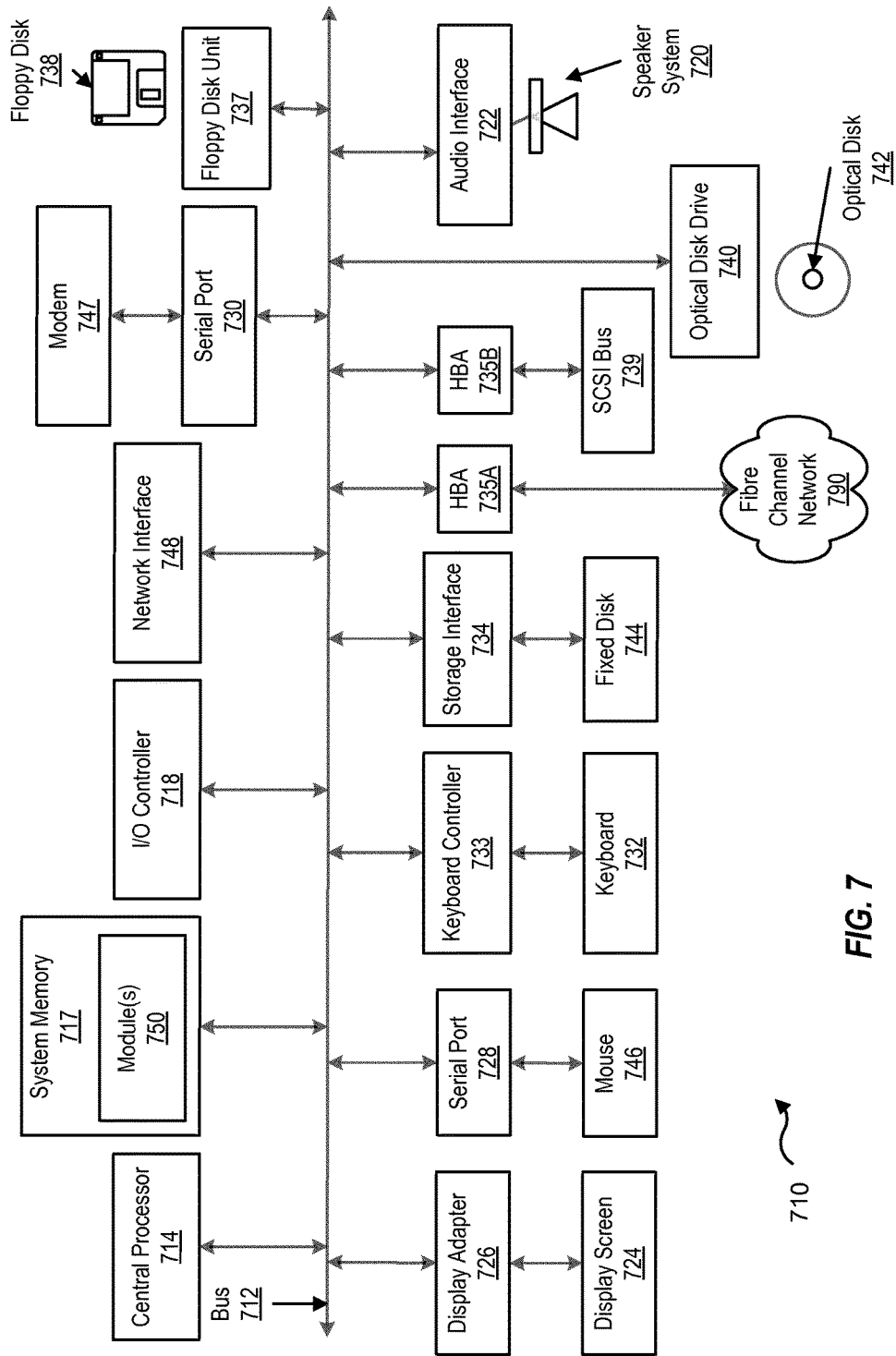
FIG. 7 is a block diagram that illustrates an example of a computer system suitable for implementing embodiments of the present application.

FIG. 7 depicts a block diagram of a computer system 710 suitable for implementing the present disclosure. Computer system 710 may be illustrative of various computer systems in the networked system of FIG. 1, such as client(s), node(s) and/or network device(s), among others. Computer system 710 includes a bus 712 which interconnects major subsystems of computer system 710, such as a central processor 714, a system memory 717 (typically RAM, but which may also include ROM, flash RAM, or the like), an input/output controller 718, an external audio device, such as a speaker system 720 via an audio output interface 722, an external device, such as a display screen 724 via display adapter 726, serial ports 728 and 730, a keyboard 732 (interfaced with a keyboard controller 733), a storage interface 734, a floppy disk drive 737 operative to receive a floppy disk 738, a host bus adapter (HBA) interface card 735A operative to connect with a Fibre Channel network 790, a host bus adapter (HBA) interface card 735B operative to connect to a SCSI bus 739, and an optical disk drive 740 operative to receive an optical disk 742. Also included are a mouse 746 (or other point-and-click device, coupled to bus 712 via serial port 728), a modem 747 (coupled to bus 712 via serial port 730), and a network interface 748 (coupled directly to bus 712).

Bus 712 allows data communication between central processor 714 and system memory 717, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 710 are generally stored on and accessed via a computer readable medium, such as a hard disk drive (e.g., fixed disk 744), an optical drive (e.g., optical drive 740), a floppy disk unit 737, or other storage medium. Additionally, applications can be in the form of electronic signals modulated in accordance with the application and data communication technology when accessed via network modem 747 or interface 748.

Storage interface 734, as with the other storage interfaces of computer system 710, can connect to a standard computer readable medium for storage and/or retrieval of information, such as a fixed disk drive 744. Fixed disk drive 744 may be a part of computer system 710 or may be separate and accessed through other interface systems. Modem 747 may provide a direct connection to a remote server via a telephone link or to the Internet via an internet service provider (ISP). Network interface 748 may provide a direct connection to a remote server via a direct network link to the Internet via a POP (point of presence). Network interface 748 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 7 need not be present to practice the present disclosure. The devices and subsystems can be interconnected in different ways from that shown in FIG. 7. The operation of a computer system such as that shown in FIG. 7 is readily known in the art and is not discussed in detail in this application. Code for the mapping network addresses in multiple network environments (such as described above with reference to the methods of FIGS. 3A, 3B, 4A, and 4B), etc., to implement the present disclosure can be stored in computer-readable storage media such as one or more of system memory 717, fixed disk 744, optical disk 742, or floppy disk 738. Memory 720 is also used for storing temporary variables or other intermediate information during the execution of instructions by the processor 710. The operating system provided on computer system 710 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:
1. A method comprising:
  receiving a first network packet from a client device in a first network, wherein
    the first network packet comprises an internal source address, and
    the internal source address is a network address of the client device in the first network;
  generating a value by executing a hashing function, wherein
    the hashing function is reversible by a reverse hashing operation, and the hashing function associates an external source address with the internal source address by virtue of generating the value based, at least in part, on the internal source address, and
at least a portion of the external source address;
generating a second network packet, wherein
the generating the second network packet comprises
including the external source address in the second network packet, and
including the value in the second network packet,
the external source address is a network address in a second network,
the external source address is associated with the internal source address by the at least the portion of the value, and
the hashing function generates the value such that, upon receipt of a third network packet comprising the value and a destination address, execution of the reverse hashing operation on the value produces the internal source address and the at least the portion of the external source address, such that the third network packet is transmitted to the internal source address, if a comparison between at least a portion of the destination address and the at least the portion of the external source address indicates that the destination address and the external source address are the same;
transmitting the second network packet into the second network; and
upon receipt of the third network packet,
recovering the internal source address and the at least the portion of the external source address by executing the reverse hashing operation, wherein the executing the reverse hashing operation recovers the internal source address without accessing any data structure that is external to both the reverse hashing operation and the third network packet,
determining whether the at least the portion of the external source address and at least a portion of the destination address are the same, and
in response to a determination that the at least the portion of the external source address and the at least the portion of the destination address are the same, transmitting at least a portion of the third network packet to the internal source address.

2. The method of claim 1, wherein
the internal source address comprises an Internet Protocol version 4 (IPv4) address of the client device, and
the IPv4 address is an internal network address of the client device in an internal IPv4 network, and
the reverse hashing operation provides translation between the destination address and the internal source address.

3. The method of claim 1, wherein
the second network packet is formatted according to one of
a first network protocol, or
a second network protocol.

4. The method of claim 3, wherein
the first network protocol is Internet Protocol version 4 (IPv4),
the second network protocol is Internet Protocol version 6 (IPv6), and
the reverse hashing operation provides translation between the destination address and the internal source address.

5. The method of claim 1, wherein
the second network packet does not comprise the internal source address.

6. The method of claim 5, further comprising:
receiving the third network packet, wherein
the third network packet does not comprise the internal source address, and
the third network packet comprises
the destination address, and
the at least the portion of the value; and
performing the reverse hashing operation on the at least the portion of the value.

7. The method of claim 6, wherein
the reverse hashing operation uses the at least the portion of the value.

8. The method of claim 1, wherein
the generating the value comprises
generating the value by executing the hashing function.

9. The method of claim 1, wherein
the external source address is a network address of the client device presented to the second network.

10. The method of claim 1, further comprising:
determining whether to use the hashing function or an address binding mechanism, wherein
the generating the value is performed in response to a determination to use the hashing function.

11. The method of claim 1, further comprising:
storing the at least the portion of the value as a stored portion of the value;
determining whether the second network packet has been received by a destination device, wherein
the destination device is a destination of the second network packet; and
in response to a determination that the second network packet has been received by the destination device, deleting the stored portion of the value.

12. The method of claim 11, wherein
the second network packet is transmitted to the destination device as a part of a data stream,
the determining whether the second network packet has been received by the destination device comprises
determining whether the data stream is received by the destination device, and
the deleting the stored portion of the value is performed in response to a determination that the data stream has been received by the destination device.

13. The method of claim 1, wherein
the receiving, the generating the value, the generating the second network packet, and the transmitting the second network packet are performed by a network device, and
the network device does not store the internal source address subsequent to the generating the value.

14. The method of claim 1, wherein
the receiving, the generating the value, the generating the second network packet, and the transmitting the second network packet are performed by a network device, and
the network device does not store the internal source address or the value, subsequent to the transmitting the second network packet into the second network.

15. The method of claim 1, further comprising:
upon receipt of a fourth packet comprising another destination address,
recovering the internal source address and the at least the portion of the external source address by executing the reverse hashing operation, wherein the executing the reverse hashing operation recovers the internal source address without accessing any data structure that is external to both the reverse hashing operation and the third network packet,
determining whether the at least the portion of the external source address and at least a portion of the another destination address are the same, and
in response to a determination that the at least the portion of the external source address and the at least the portion of the destination address are different, preventing transmission of at least a portion of the fourth packet to the internal source address.

16. The method of claim 1, wherein
the hashing function generates the value using only information in the first network packet as inputs to the hashing function; and
the reverse hashing operation produces the internal source address using only information in the third network packet as inputs to the reverse hashing operation.

17. An apparatus, comprising:
one or more processors; and
a first module, executable by the one or more processors, configured to
receive a first network packet from a client device in a first network, wherein
the first network packet comprises
an internal source address, and
the internal source address is a network address of the client device in the first network,
generate a value by executing a hashing function, wherein
the hashing function is reversible by a reverse hashing operation, and
the hashing function associates an external source address with the internal source address by virtue of generating the value based, at least in part, on the internal source address, and
at least a portion of the external source address,
generate a second network packet, wherein
the first module is configured to generate the second network packet by virtue of being configured to include the external source address in the second network packet, and
include the value in the second network packet,
the external source address is a network address in a second network,
the external source address is associated with the internal source address by the value,
the value is configured to facilitate a reverse hashing operation,
the reverse hashing operation is a reverse operation of the hashing function, and
the first module is further configured to generate the value such that, upon receipt of a third network packet from the second network, wherein the third network packet comprises the value and a destination address, the first module is configured to
produce the internal source address and the at least the portion of the external source address by executing the reverse hashing operation on the value and at least a portion of the destination address, and
transmit the third network packet to the internal source address, if a comparison between at least a portion of the destination address and the at least the portion of the external source address indicates that the destination address and the external source address are the same,
transmit the second network packet into the second network and
upon receipt of the third network packet,
recover the internal source address and the at least the portion of the external source address by executing the reverse hashing operation, wherein the executing the reverse hashing operation recovers the internal source address without accessing any data structure that is external to both the reverse hashing operation and the third network packet,
determine whether the at least the portion of the external source address and at least a portion of the destination address are the same, and
in response to determining that the at least the portion of the external source address and the at least the portion of the destination address are the same, transmit at least a portion of the third network packet to the internal source address.

18. The apparatus of claim 17, wherein the second network packet does not comprise the internal source address.

19. The apparatus of claim 17, wherein the external source address is a network address of the client device presented to the second network.

20. The apparatus of claim 17, wherein
the first module is further configured to
receive the third network packet, wherein
the third network packet does not comprise the internal source address, and
the third network packet comprising
the destination address, and
the at least the portion of the value, and
generate the internal source address by performing the reverse hashing operation,
the reverse hashing operation using, at least in part, the at least the portion of the value and the destination address.

21. The apparatus of claim 17, wherein the second network packet does not comprise the internal source address.

22. A computer program product comprising:
a plurality of instructions, comprising
a first set of instructions, executable on a computer system, configured to receive
a first network packet from a client device in a first network, wherein
the first network packet comprises
an internal source address, and
the internal source address is a network address of the client device in the first network,
a second set of instructions, executable on the computer system, configured to generate a value by executing a hashing function, wherein
the hashing function is reversible by a reverse hashing operation, and
the hashing function associates an external source address with the internal source address by virtue of generating the value based, at least in part, on the internal source address, and
at least a portion of the external source address,
a third set of instructions, executable on the computer system, configured to
generate a second network packet, wherein
the second network packet comprises
the external source address, and
the value,
the external source address is a network address in a second network, the external source address is associated with the internal source address by the value, the value is generated such that, upon a third network packet comprising the at least the portion of the value and a destination address, being received from the second network, execution of the reverse hashing operation on the value produces the internal source address and the at least the portion of the external source address, such that the third network packet is transmitted to the internal source address, if a comparison between at least a portion of the destination address and the at least the portion of the external source address indicates that the destination address and the external source address are the same, transmit the second network packet into the second network, and upon receipt of the third network packet, recover the internal source address and the at least the portion of the external source address by executing the reverse hashing operation, wherein the executing the reverse hashing operation recovers the internal source address without accessing any data structure that is external to both the reverse hashing operation and the third network packet, determine whether the at least the portion of the external source address and at least a portion of the destination address are the same, and in response to determining that the at least the portion of the external source address and the at least the portion of the destination address are the same, transmit at least a portion of the third network packet to the internal source address; and a non-transitory computer-readable storage medium, wherein the instructions are encoded in the non-transitory computer-readable storage medium.

23. The computer program product of claim 22, wherein the second network packet does not comprise the internal source address.

* * * * *